(12) United States Patent
Art et al.

(10) Patent No.: US 8,616,309 B2
(45) Date of Patent: Dec. 31, 2013

(54) WHEELCHAIR

(75) Inventors: Christopher Art, Dickson City, PA (US); Gerald White, Hunlock Creek, PA (US); Matthew Tolan, Dunmore, PA (US); Christopher Grymko, Laflin, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 520 days.

(21) Appl. No.: 12/901,821

(22) Filed: Oct. 11, 2010

(65) Prior Publication Data

US 2011/0083914 A1  Apr. 14, 2011

Related U.S. Application Data

(60) Provisional application No. 61/250,752, filed on Oct. 12, 2009.

(51) Int. Cl.
*B60K 1/00* (2006.01)

(52) U.S. Cl.
USPC .................. 180/65.1; 180/68.5; 180/907

(58) Field of Classification Search
USPC ........................ 180/65.1, 68.5, 907
See application file for complete search history.

(56) References Cited

U.S. PATENT DOCUMENTS

| | | | |
|---|---|---|---|
| 4,165,093 A | 8/1979 | Biskup | |
| 4,355,695 A | 10/1982 | Leskovec | |
| 4,967,864 A * | 11/1990 | Boyer et al. | 180/65.1 |
| 5,036,938 A * | 8/1991 | Blount et al. | 180/208 |
| 5,121,806 A | 6/1992 | Johnson | |
| 5,275,248 A * | 1/1994 | Finch et al. | 180/65.6 |
| 5,513,721 A * | 5/1996 | Ogawa et al. | 180/220 |
| 5,522,734 A * | 6/1996 | Goertzen | 439/500 |
| 5,531,284 A * | 7/1996 | Okamoto | 180/65.1 |
| D404,693 S | 1/1999 | Schaffner | |
| 6,053,519 A | 4/2000 | Poindexter et al. | |
| D428,367 S | 7/2000 | Lundh | |
| 6,095,271 A | 8/2000 | Dickie et al. | |
| 6,145,612 A | 11/2000 | Dickie | |
| 6,186,256 B1 | 2/2001 | Dignitti | |
| 6,196,343 B1 * | 3/2001 | Strautnieks | 180/22 |
| 6,234,507 B1 * | 5/2001 | Dickie et al. | 280/304.1 |
| 6,247,714 B1 | 6/2001 | Rasmussen et al. | |
| 6,341,657 B1 * | 1/2002 | Hopely et al. | 180/6.5 |
| 6,357,776 B1 * | 3/2002 | Goertzen et al. | 280/304.1 |
| 6,375,209 B1 * | 4/2002 | Schlangen | 280/250.1 |
| D468,669 S | 1/2003 | Hopely | |
| 6,508,322 B2 | 1/2003 | Dignitti et al. | |
| 6,601,863 B1 * | 8/2003 | Mentessi et al. | 280/304.1 |
| 6,640,916 B2 * | 11/2003 | Schaffner et al. | 180/65.1 |
| 6,699,616 B2 | 3/2004 | Wu | |
| D491,115 S | 6/2004 | Taylor | |

(Continued)

*Primary Examiner* — Katy M Ebner
(74) *Attorney, Agent, or Firm* — Woodcock Washburn LLP

(57) ABSTRACT

A front wheel drive powered wheelchair is provided and may include a support frame, a pair of opposing drive wheels, a pair of drives, and a pair of rear wheels. The frame may include a front portion, a seat post, and two independent arms extending rearward from the front portion. Each drive wheel may be coupled to the front portion of the frame. Each drive may be mounted to the front portion of the frame and may be operatively connected to a respective drive wheel of the pair of drive wheels. Each rear wheel may be coupled to a respective independent arm of the support frame. Each independent arm may be capable of flexing independent of the other.

25 Claims, 10 Drawing Sheets

(56) References Cited

U.S. PATENT DOCUMENTS

| | | | | |
|---|---|---|---|---|
| D494,110 | S | 8/2004 | Cheng | |
| 6,932,371 | B2 | 8/2005 | Perez | |
| 6,938,923 | B2 * | 9/2005 | Mulhern et al. | 280/755 |
| 7,040,429 | B2 | 5/2006 | Molnar | |
| 7,150,463 | B1 * | 12/2006 | Liao | 280/124.128 |
| D536,283 | S | 2/2007 | Cartellone et al. | |
| 7,174,983 | B1 * | 2/2007 | Hsiao | 180/208 |
| D540,221 | S | 4/2007 | Cartellone et al. | |
| 7,207,403 | B2 | 4/2007 | Grymko | |
| 7,219,924 | B2 * | 5/2007 | Mulhern et al. | 280/755 |
| 7,221,123 | B2 * | 5/2007 | Chen | 320/104 |
| 7,252,168 | B2 * | 8/2007 | Lin et al. | 180/208 |
| 7,270,208 | B2 * | 9/2007 | Huang | 180/68.5 |
| D561,066 | S | 2/2008 | Cheng | |
| 7,357,206 | B2 | 4/2008 | Fobean | |
| 7,401,675 | B2 * | 7/2008 | Chang | 180/208 |
| 7,413,045 | B2 | 8/2008 | Tien | |
| 7,431,109 | B2 * | 10/2008 | Jones et al. | 180/65.1 |
| 7,506,709 | B2 * | 3/2009 | Kiwak et al. | 180/65.1 |
| D590,304 | S | 4/2009 | Kruse | |
| 7,516,984 | B2 * | 4/2009 | Tang | 280/755 |
| 7,562,903 | B2 * | 7/2009 | Kramer et al. | 280/755 |
| 7,735,591 | B2 * | 6/2010 | Puskar-Pasewicz et al. | 180/68.5 |
| 7,766,106 | B2 * | 8/2010 | Puskar-Pasewicz et al. | 180/65.1 |
| 7,942,445 | B2 * | 5/2011 | Kramer et al. | 280/755 |
| 8,037,953 | B2 * | 10/2011 | Puskar-Pasewicz et al. | 180/65.1 |
| 8,113,531 | B2 * | 2/2012 | Zhou et al. | 280/304.1 |
| 8,177,257 | B2 * | 5/2012 | Dugas et al. | 280/755 |
| 8,267,210 | B2 * | 9/2012 | Jones et al. | 180/68.5 |
| 8,292,010 | B2 * | 10/2012 | Puskar-Pasewicz et al. | 180/65.1 |
| 2001/0013437 | A1 * | 8/2001 | Husted et al. | 180/65.1 |
| 2004/0084230 | A1 | 5/2004 | Grymko et al. | |
| 2007/0001442 | A1 | 1/2007 | Chiu | |
| 2007/0063499 | A1 * | 3/2007 | Shem | 280/755 |
| 2007/0107963 | A1 * | 5/2007 | Chiu | 180/68.5 |
| 2008/0087481 | A1 * | 4/2008 | Grymko et al. | 180/68.5 |
| 2009/0000835 | A1 | 1/2009 | Jones et al. | |

\* cited by examiner

WHEELCHAIR

CROSS REFERENCE TO RELATED APPLICATIONS

This application claims priority to U.S. provisional application 61/250,752 filed Oct. 12, 2009, the contents of which are incorporated by reference in their entirety.

TECHNICAL FIELD

Generally the invention is directed to a wheelchair. More particularly, the invention is directed to a front-wheel drive wheelchair.

BACKGROUND

Powered wheelchairs typically have six wheels, a pair of drives, and a power supply (typically batteries) all mounted to or supported by a frame. While there are many different frame designs that can accommodate the wheels, drives and power supply, these frames are rigid, use a lot of metal and are limited in their functionality. With costs rising, and an increasing demand for wheelchairs having certain functional characteristics, there is a constant need for innovation in the industry. In particular, there is a need for a simple, cost effective wheelchair that accommodates the needs and desires of the users. Such needs may include comfort, and easy battery access.

SUMMARY

In one embodiment, a front wheel drive powered wheelchair according to the present invention may include a support frame, a pair of opposing drive wheels, a pair of drives, and a pair of rear wheels. The frame may include a front portion, a seat post, and two independent arms extending rearward from the front portion. Each drive wheel may be coupled to the front portion of the frame. Each drive may be mounted to the front portion of the frame and may be operatively connected to a respective drive wheel of the pair of drive wheels. Each rear wheel may be coupled to a respective independent arm of the support frame. Each independent arm may be capable of flexing independent of the other.

In another embodiment, a powered wheelchair may include a frame having a seat post, a seat coupled to the seat post, a power supply assembly supported by the frame, a pair of drive wheels mounted to the frame, a pair of drives mounted on the frame, and a shroud mounted over the frame. Each drive may be operatively coupled o a respective drive wheel of the pair of drive wheels. The shroud may include a first portion and a second portion. The first portion of the shroud may cover the power supply assembly and may be removed without removing the seat.

In another embodiment, a powered wheelchair may include a support frame, a seat, a pair of opposing drive wheels, a pair of drives, a pair of rear wheels, and a power supply assembly. The frame may include a front portion, a seat post, and two independent arms extending rearward from the front portion. The seat may be coupled to the seat post. Each drive wheel may be coupled to the front portion of the frame. The drives may be mounted on the frame, and may each be operatively connected to a respective drive wheel of the pair of drive wheels. Each rear wheel may be coupled to a respective independent arm. The power supply assembly, may be fully supported by the two independent arms of the frame.

DETAILED DESCRIPTION OF ILLUSTRATIVE EMBODIMENTS

A preferred frame and other components of a personal mobility device are described herein. An embodiment of a front-wheel drive powered wheelchair that employs this technology is also described. The present invention is not limited to the disclosed configuration of a front wheel drive powered wheelchair, but rather encompasses use of this technology disclosed in any powered wheelchair according to the language of the claims.

Figure 1A:
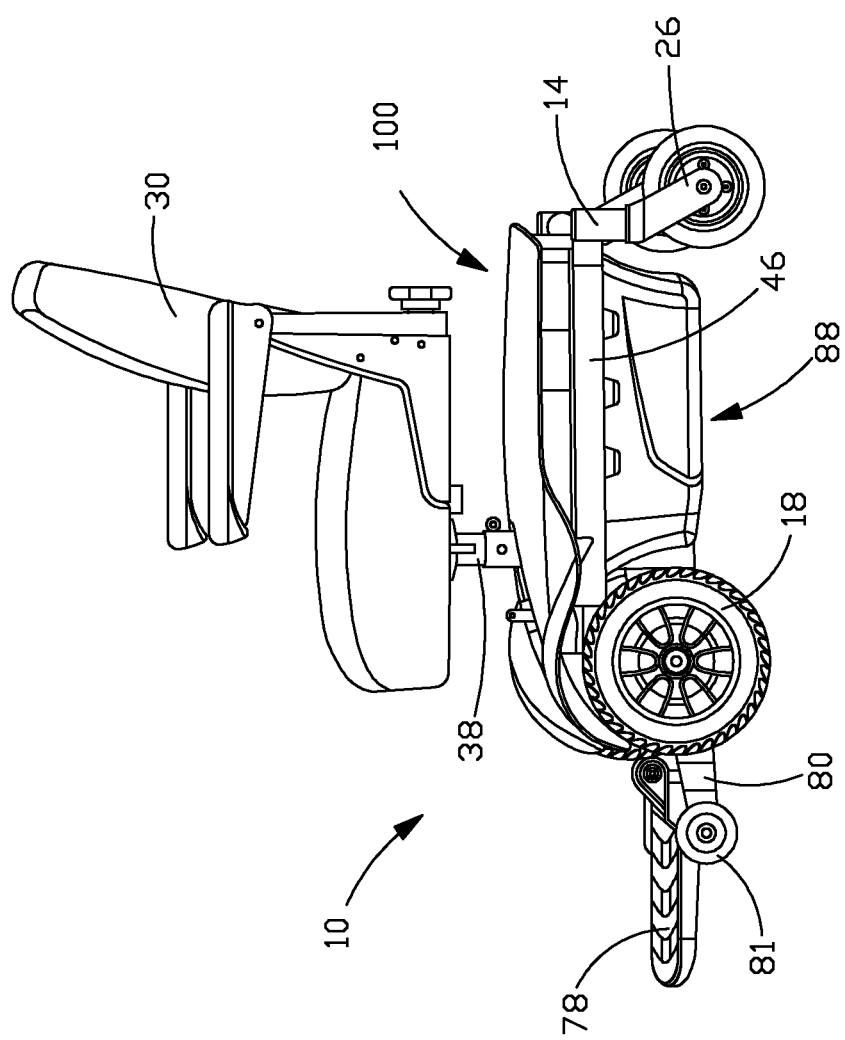
FIG. 1A is side elevational view of a front-wheel drive wheelchair constructed in accordance with one embodiment.

Referring now to the drawings, wherein like reference numerals identify like elements, FIG. 1A depicts a powered wheelchair 10. Powered wheelchair 10 is a front wheel drive powered wheelchair. Here, "front wheel drive" means that the main drive wheels are nominally in the front of the wheelchair. Though not shown in the Figures, the term "front wheel drive" as used herein encompasses rigid front anti-tip wheels (that is, wheels supported on an arm that is affixed, without the capability to rotate or pivot, to the frame; either raised or on ground-contacting casters), and front anti-tip wheels supported on an arm that pivots on the frame so long as the arm is not biased by motor torque, such as via a mechanical connection (such as a direct connection or connection through a linkage), even though the front anti-tip wheels may be located nominally in front of the drive wheels. The term "front wheel drive" does not encompass front anti-tip wheels that are biased by motor torque by mechanical linkage between the motor and front anti-tip wheels such as shown in U.S. Pat. No. 5,944,131 (Schaffner). The present invention is not limited to front wheel drive wheelchairs unless specifically recited in the claim, and this definition is merely for clarity of description of the preferred embodiment.

As shown in FIGS. 1A-1D, wheelchair 10 includes a support frame 14, a set of drive wheels 18 coupled to the frame 14, and a pair of drive assemblies 22 mounted on the frame 14 and operatively coupled to the drive wheels 18. The frame 14 further includes a set of rear wheel assemblies 26 that are coupled to a rear portion of the frame 14, and a seat 30 that is mounted on top of the frame 14.

In the illustrated embodiment, the support frame 14 in is a semi-rigid structure that is formed of welded and/or bolted square and round tubing and formed plates. Support frame 14 includes a front portion 34, a seat post 38 extending up from the frame proximate to the front portion 34, a first independent arm 42 extending rearward from the front portion 34, and a second independent arm 46 extending rearward from the front portion 34. The support frame 14 is designed to provide enough support for all of the components of the wheelchair 10 and a user, while at the same time using as little material as possible.

Figure 1B:
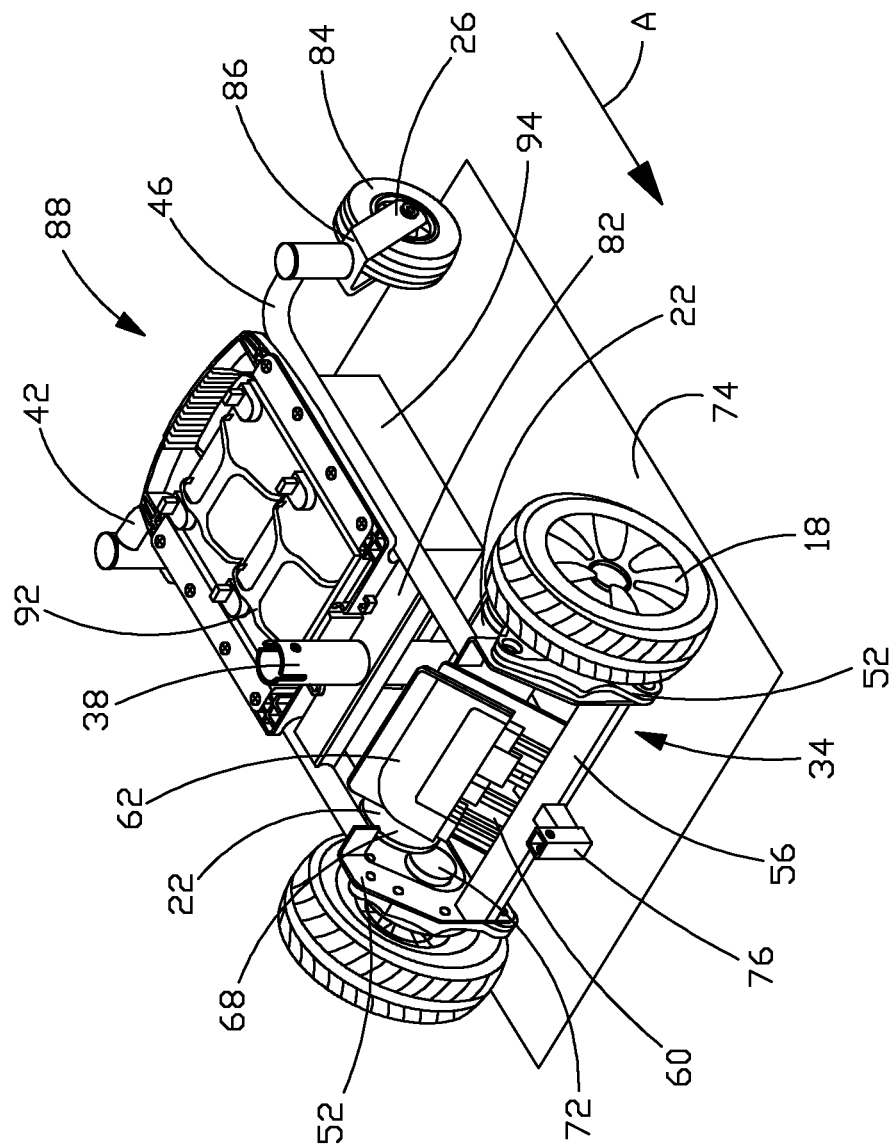
FIG. 1B is a front perspective view of the wheelchair shown in FIG. 1A with the entire shroud, seat, and footrest removed for clarity.

As shown in FIG. 1B, the front portion 34 of the support frame 14 includes two support plates 52, a transverse beam 56 extending between the plates 52, and an angled support plate 60 extending up from the transverse beam 56. The front portion 34 encompasses the portion of frame 14 that is forward to the seat post 38. The front portion 34 is capable of supporting the drive wheels 18, the drive assemblies 22, and a controller 62.

As shown in FIG. 1B, each support plate 52 has a respective drive wheel 18 and drive assembly 22 mounted to it. Each drive assembly 22 includes a motor 68, and a gear box 72. Each motor 68 is connected to one of the drive wheels 18. Motors 68 are preferably mounted transverse to the direction of translation of the wheelchair. As illustrated by arrow A shown for example in FIG. 1B, the direction of translation is parallel to a ground plane surface 74 on which the wheel chair moves forward. A transverse axis of the motors 68 is parallel to the axis of rotation of drive wheels 18 and parallel to the level ground.

As shown in FIG. 1B, the transverse beam 56 extends between the support plates 52 and the angled support 60 extends up from the transverse beam 56. As shown, the frame 14 further includes a footrest support 76 that extends forward from the transverse beam 56. The footrest support 76 supports a footrest 78 as shown in FIG. 1A. As shown in FIG. 1B, the angled support 60 extends up from the transverse beam 56 at an angle and over the drive assemblies 22. The angle support 60 is configured to support the controller 62.

Figure 1C:
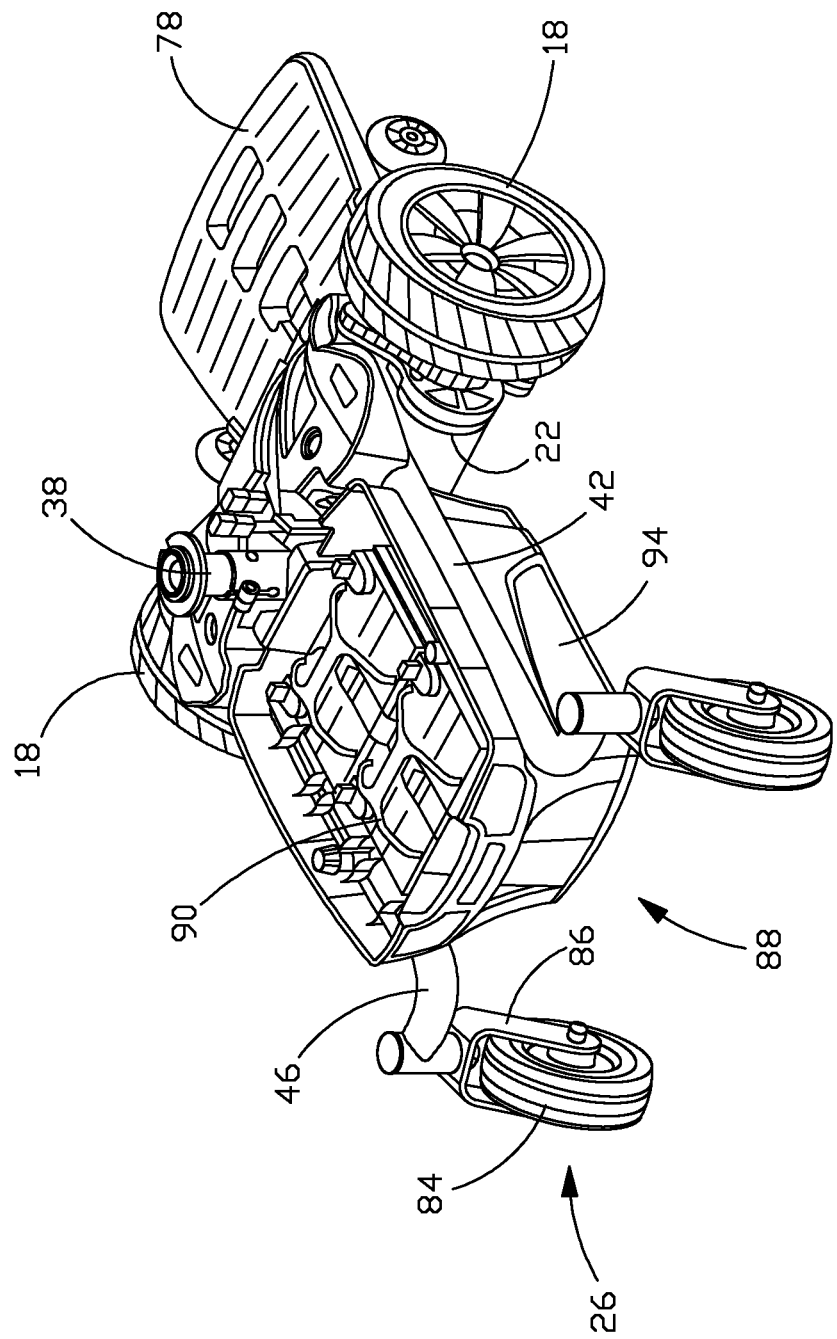
FIG. 1C is a rear perspective view of the wheelchair shown in FIG. 1A with a portion of the shroud, and the seat removed for clarity.
Figure 1D:
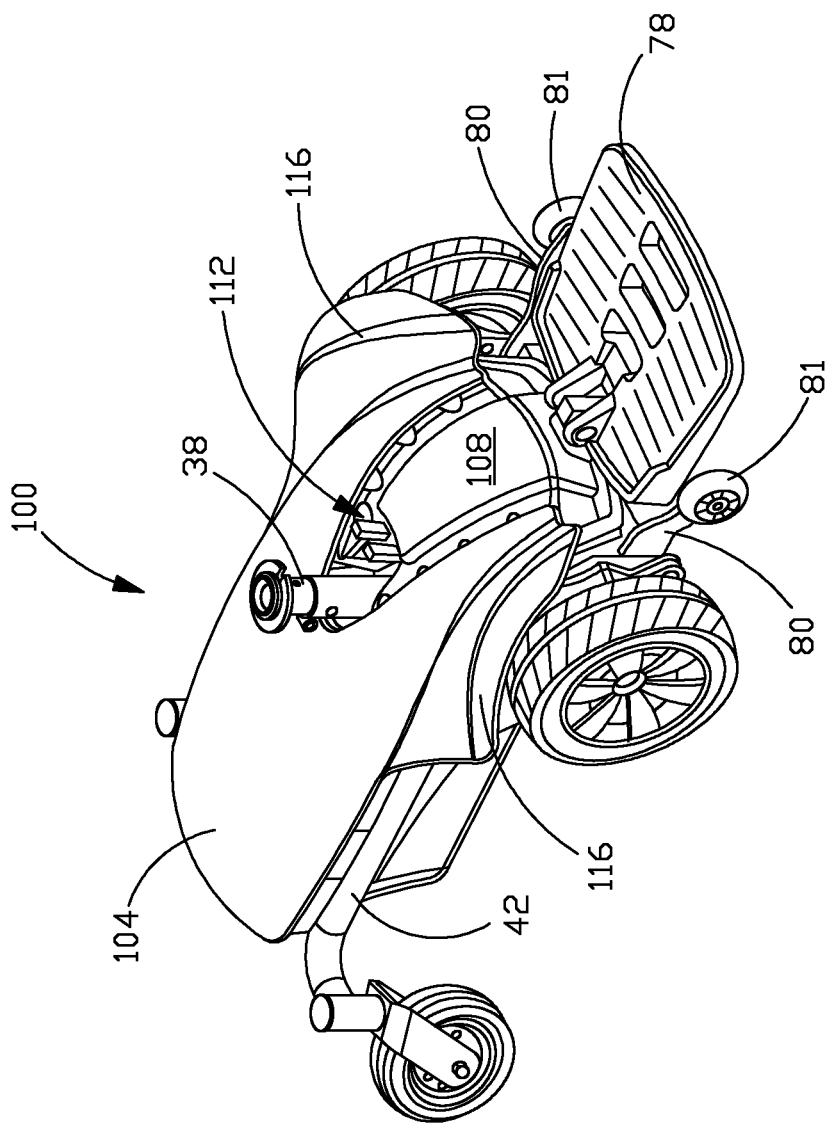
FIG. 1D is a front perspective view of the wheelchair shown in FIG. 1A with the seat removed for clarity.

As best shown in FIGS. 1A and 1D, the wheelchair 10 may also include front anti-tip wheel assemblies 80 that extend from the front portion 34 of the support frame 14. As shown, each front anti-tip wheel assembly 80 includes a wheel 81 that is elevated from the ground plane surface 74.

As shown in FIGS. 1A and 1B, the seat post 38 extends up from the frame 14 proximate to a rear end of the front portion 34. As shown, the frame 14 further includes a second transverse beam 82 that extends between the first and second independent arms 42 and 46, and helps support the seat post 38. As shown in FIG. 1A, the seat post 38 supports and maintains the seat 30.

As shown in FIG. 1B, the independent arms 42 and 46 each extend rearwardly from a respective support plate 52. As shown, the independent arms 42 and 46 form a major portion of the frame 14. While the arms 42 and 46 are connected by second the transverse beam 82 they are considered independent from each other because a rear portion, behind the seat post 38, of the arms 42 and 46 are not connected to each other. Accordingly, a back end of each arm 42 and 46 is free relative to the other. As shown, the back ends of each independent arm 42 and 46 flares outwardly and forms a ninety degree angle with a major portion of its arm. The flared ends provide more stability to wheelchair 10.

As shown in FIGS. 1A-1D, a rear wheel assembly 26 is coupled to the back end of each independent arm 42 and 46. The rear wheel assemblies 26 provide stability for wheelchair 10 and are each capable of rotating about a vertical axis. Each rear wheel assembly 26 includes a rear wheel 84 that is rotatably coupled to a bracket 86. Each Bracket 86 is coupled to a respective arm 42 and 46, to thereby attach each rear wheel assembly 26 to the frame 14. Like drive wheels 18, rear wheels 84 are in contact with the ground surface.

As shown in FIGS. 1B and 1C, the drive assemblies 22 are powered by a power supply assembly 88. Power supply assembly 88 includes two batteries 90 housed in a battery compartment 94. The battery compartment 94 is a box-like structure that spans a distance between the independent arms 42 and 46. As shown, the battery compartment 94 rests on, and is supported by the independent arms 42 and 46. The battery compartment 94 when fully inserted, abuts the second transverse beam 82. The battery compartment 94 provides some rigidity to the frame 14 and in particular to the independent arms 42 and 46. Specifically, the battery compartment 94 prevents the arms 42 and 46 from flexing in a horizontal plane and reduces flexing in an up/down direction. It should be understood, however, that the battery compartment 94 is not to completely reduce vertical flexing as this vertical flexing provides for a built in suspension, which will be discussed in relation to FIGS. 5A and 5B.

As shown in FIG. 1D, the wheelchair 10 includes a shroud 100 that covers the frame 14, along with the batteries 90, the drive assemblies 22, and the controller 62. As shown, the shroud 100 includes a first portion 104 and a second portion 108. The shroud 100 is designed such that the batteries 90 may be easily uncovered and accessed with minimal hassle for the user.

As shown in FIG. 1D, the first portion 104 comprises a majority of the shroud 100. The first portion 104 includes a slot 112 that extends rearward from a front of the portion 104. As shown, the slot 112 is generally U-shaped or V-shaped, and is open at the front of the first portion 104. The slot 112 extends from the open front to a point proximate to a rear of the seat post 38. Thus, the seat post 38 extends up and through the slot 112 of the first portion 104. The first portion 104 also includes two fenders 116 formed on each side of the first portion 104. The fenders 116 partially cover the drive wheels 18 to thereby act as splash guards.

The second portion 108 of the shroud 100 is affixed to the frame 14 and covers at least a portion of the drive assemblies 22, and the controller 62. As shown, the second portion 108 is U-shaped or V-shaped and generally covers the portion of wheelchair 10 that is exposed by the slot 112 of the first portion 104. Accordingly, the second portion 108 extends from a front of the frame 14 up to a point proximate to a front of the seat post 38.

Figure 2:
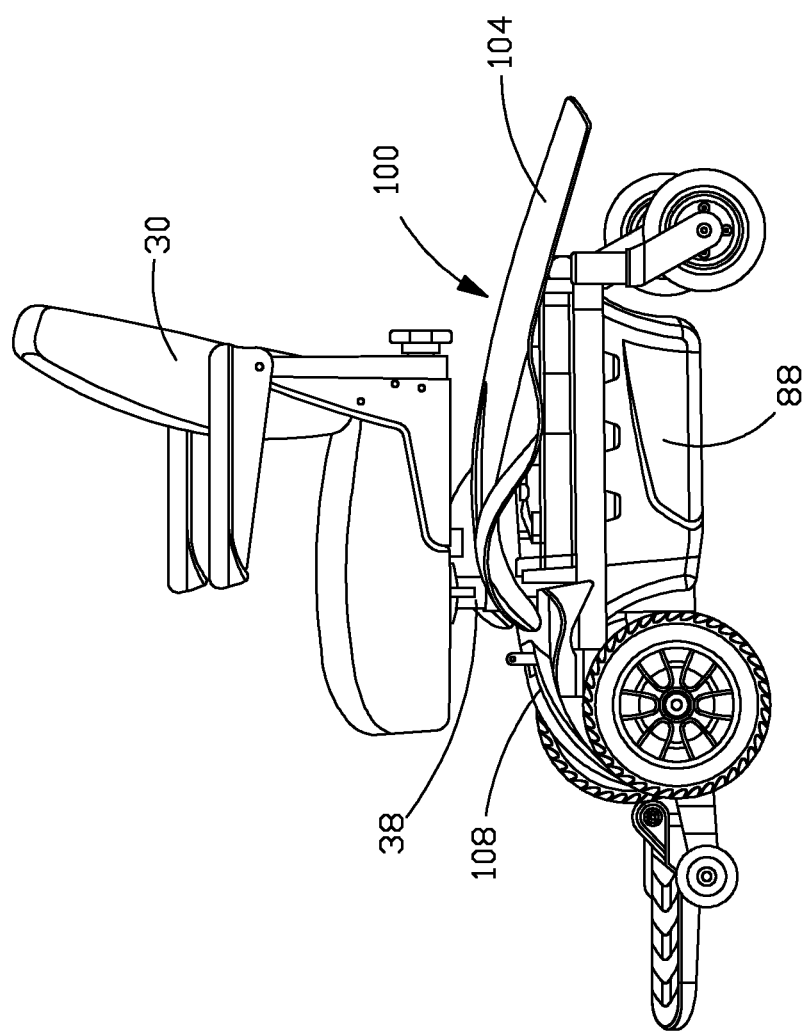
FIG. 2 is a side elevational view of the wheelchair shown in FIG. 1A showing a portion of the shroud being removed while the seat is connected to the wheelchair.

As shown in FIG. 2, the first portion 104 of the shroud 100 may be removed without removing the seat 30. Because the first portion 104 includes the slot 112 having an open front, the first portion 104 may be unfastened and then pulled rearward, to thereby remove the first portion 104 and expose the power supply assembly 88 without removing the seat 33. Accordingly, with such a design, a user can have easy access to the batteries 90.

Figure 3A:
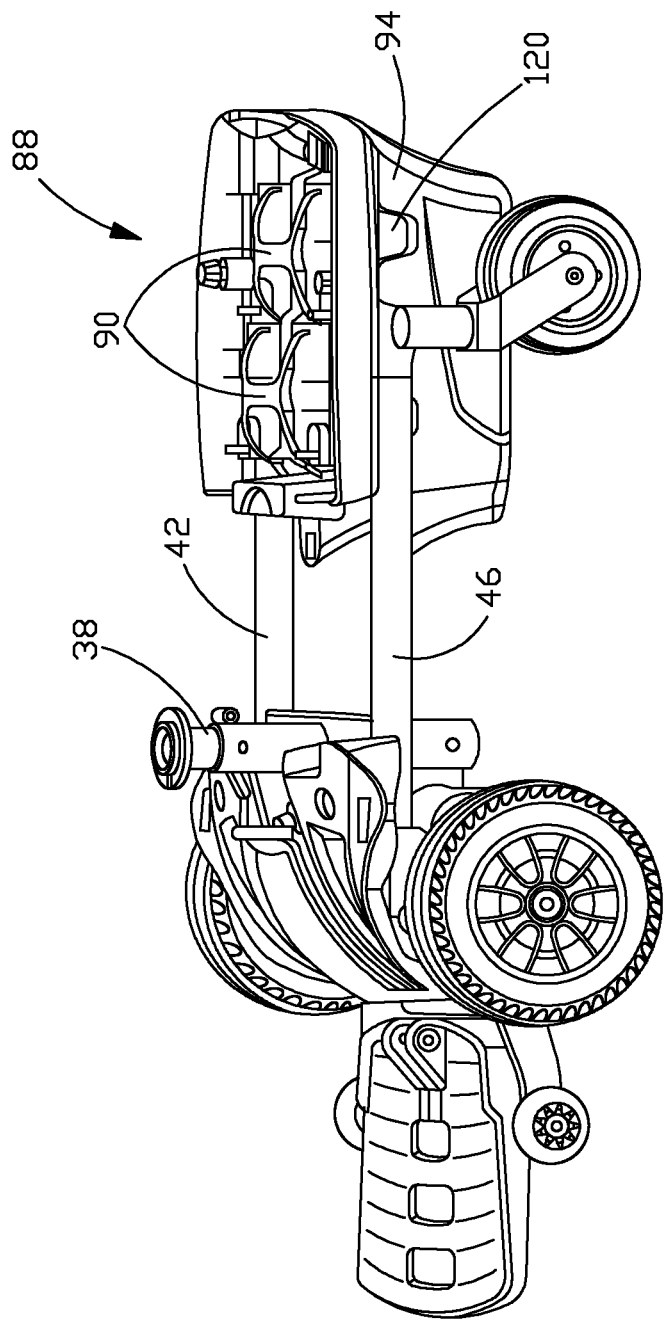
FIG. 3A is a side elevational view of the wheelchair shown in FIG. 1C showing a battery compartment being removed.
Figure 3B:
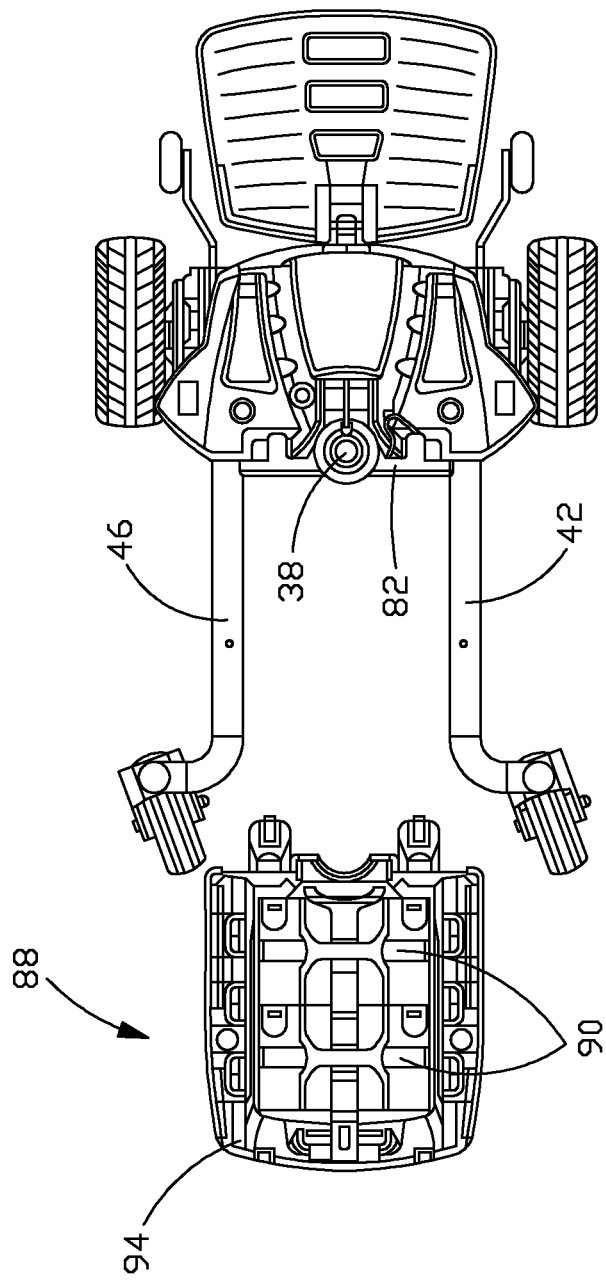
FIG. 3B is a top plan view of the wheelchair shown in FIG. 1C with the battery compartment completely removed.

As shown in FIGS. 3A and 3B, the power supply assembly 88 may be removed once the first portion 104 of the shroud 100 is removed. As shown, the power supply assembly 88 may be removed by pulling the battery compartment 94 rearward. The battery compartment 94 may cooperate with the independent arms 42 and 46 such that the battery compartment 94 slides along the independent arms 42 and 46 like a kitchen drawer being opened and closed. Accordingly, the battery compartment 94 includes a rail 120 on each side of the battery compartment 94 that engages a respective independent arm 42 and 46. In the illustrated embodiment, the rails 120 are defined by spaced apart hooks. As shown in FIG. 3B, the battery compartment 94 may be completely removed thereby providing a user easy access to the batteries 90.

Figure 4B:
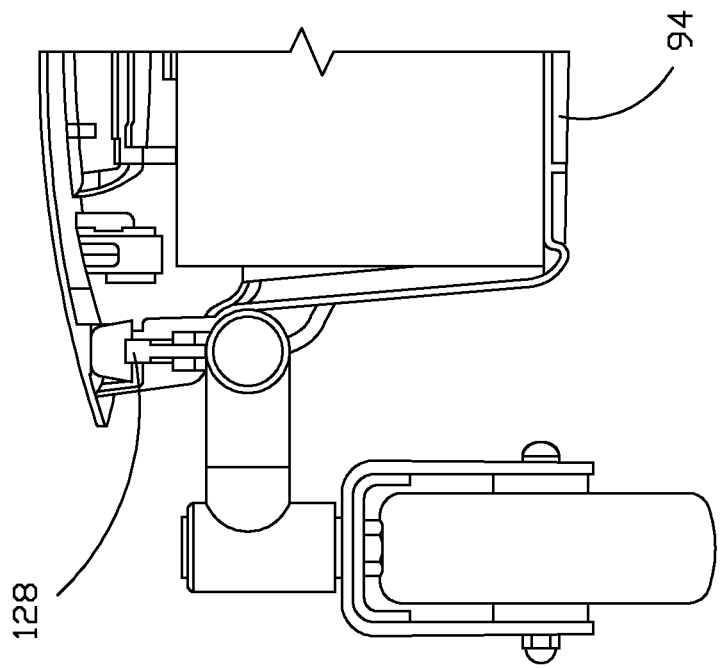
FIG. 4B is an enhanced view showing the locking mechanism of FIG. 4B in an unlocked position.
Figure 4A:
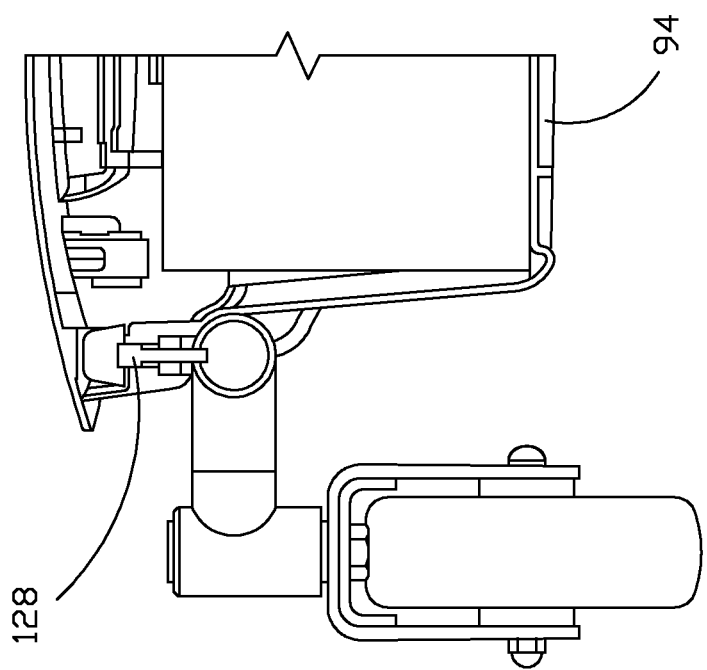
FIG. 4A is an enhanced view showing a locking mechanism for locking the battery compartment in place, in a locked position.

As shown in FIGS. 4A and 4B the battery compartment includes a locking mechanism 128. The locking mechanism 128 may ensure that the battery compartment 94 is in place prior to placing the first portion 104 of the shroud 100 back onto the wheelchair 10. This would build in a safety mechanism before a user utilizes the wheelchair 10. As shown, the locking mechanism 128 is formed on a back side of the battery compartment 94. In the illustrated embodiment, the battery compartment 94 includes two locking mechanisms 128, one formed on each side of the battery compartment 94. Each locking mechanism 128 may be a thumb screw that connects to a respective independent arm 42 and 46. FIG. 4A shows the locking mechanism 128 in a latched position, and FIG. 4B shows the locking mechanism 128 in an unlatched position.

Figure 5A:
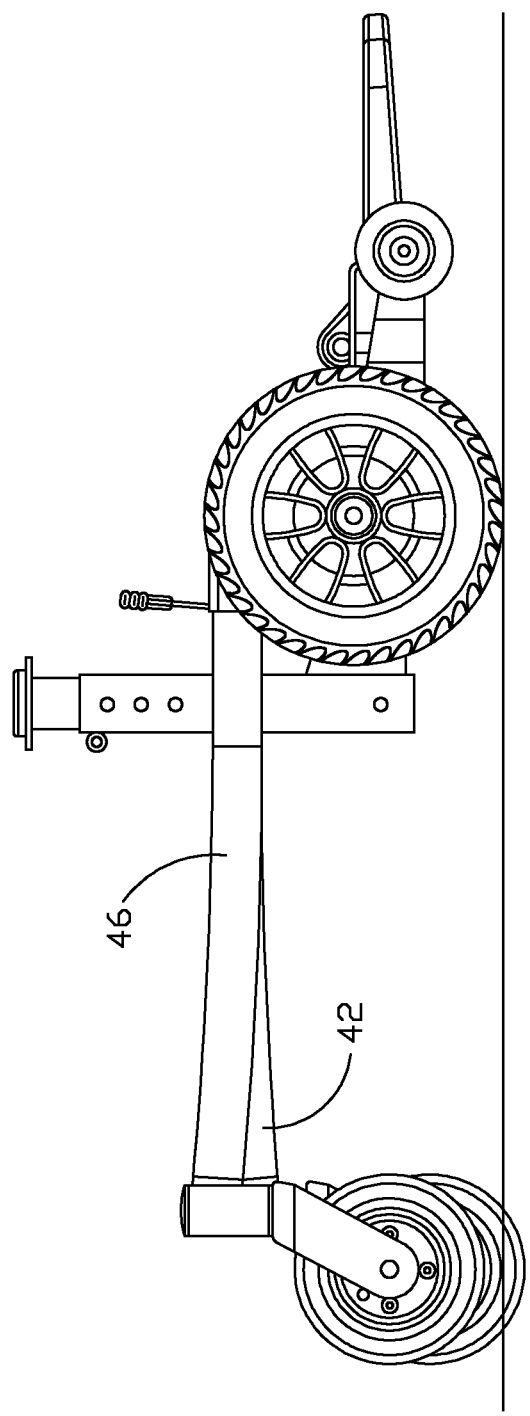
FIG. 5A is a side elevational view showing independent arms of the frame flexing.
Figure 5B:
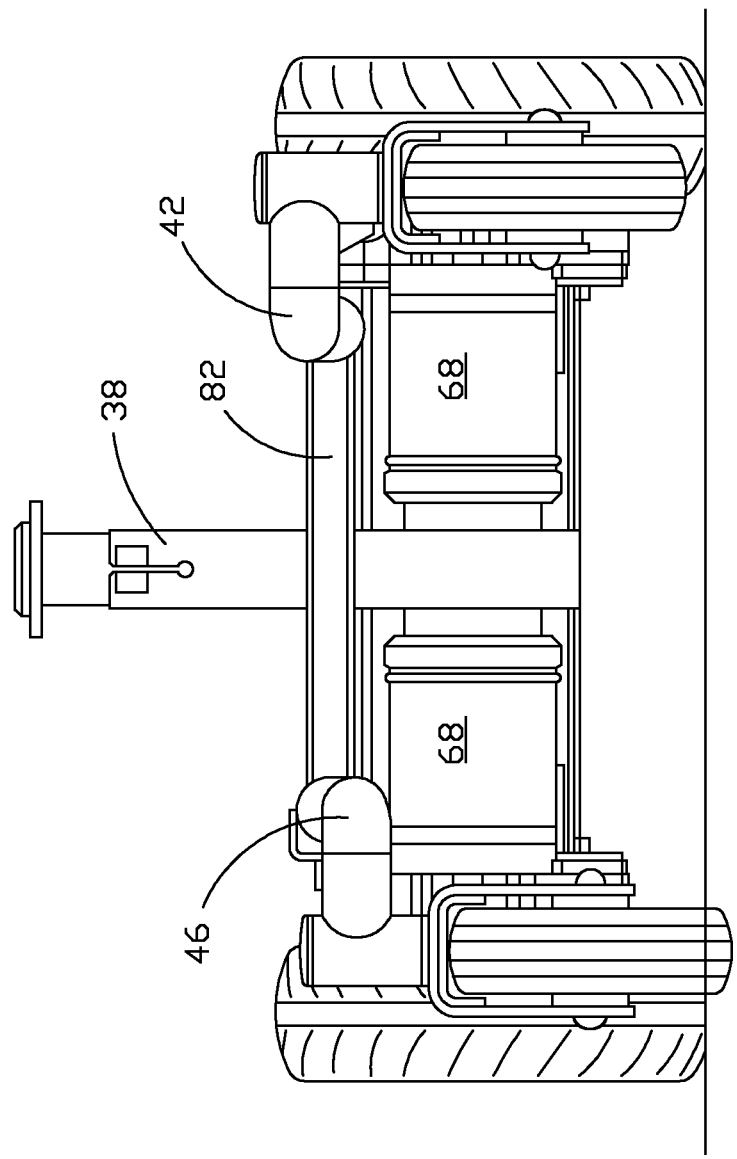
FIG. 5B is a rear elevational view of the flexed arms shown in FIG. 5A.

As shown in FIGS. 5A and 5B, each independent arm 42 and 46 is capable of flexing independent of the other. That is, each independent arm 42 and 46 may function like a leaf spring when necessary. Such a design forms a suspension in the wheelchair 10. Depending on certain factors such as length of the arms, and material used, each arm 42 and 46 may flex about ⅛-2 inches relative to the other. It should be understood, however, that the arms 42 and 46 are not limited to a flex range of ⅛-2 inches and may include flexing ranges outside of this range. The structural design of the arms 42 and 46 will depend on well know parameters, such as choice of material, desired magnitude of flexing, length of the arms and other sizes of components, weight of the batteries, and the like.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Further, several advantages have been described that flow from the structure and methods; the present invention is not limited to structure and methods that encompass any or all of these advantages. Those skilled in personal mobility technology, having the benefit of the teachings of this specification, may effect numerous modifications to the invention as described herein, and changes can be made without departing from the scope and spirit of the invention as defined by the appended claims. Furthermore, any features of one described embodiment can be applicable to the other embodiments described herein. For example, any features or advantages related to the design of the frame, shroud, or battery compartment with respect to discussion of a particular wheelchair embodiment can be applicable to any other wheelchair embodiments.

What is claimed:

1. A front wheel drive powered wheelchair comprising:
   a frame including a front portion having a transverse beam, the frame further including a seat post, and two independent arms that are coupled to and extend rearward from the transverse beam so as to define respective cantilevers;
   a power supply assembly that engages the two independent arms such that the power supply assembly is removably supported by the two independent arms;
   a pair of opposing drive wheels coupled to the front portion of the frame;
   a pair of drives mounted on the frame, each drive operatively coupled to a respective drive wheel; and
   a pair of rear wheels, each rear wheel coupled to a respective independent arm,
   wherein each independent arm is capable of flexing independent of the other.

2. The wheelchair of claim 1, wherein the power supply assembly includes a battery compartment and at least one battery positioned in the battery compartment.

3. The wheelchair of claim 1, wherein the power supply assembly slidably engages the independent arms from the rear.

4. The wheelchair of claim 1, wherein the seat post extends up from the transverse beam, the wheelchair further comprising a seat mounted on the seat post.

5. The wheelchair of claim 4, further comprising a shroud mounted over the frame, wherein the shroud is removable without removing the seat.

6. The wheelchair of claim 5, wherein (i) the shroud comprises a first portion and a second portion, (ii) the first portion includes a slot that is adapted to fit around the seat post, and (iii) the first portion is removable while the second portion remains mounted to the frame.

7. The wheelchair of claim 6, wherein the second portion of the shroud covers at least a portion of the drives.

8. The wheelchair of claim 1, wherein the drives are mounted transversely to a longitudinal axis of the wheelchair.

9. A powered wheelchair comprising:
   a frame including a seat post;
   a seat coupled to the seat post;
   a power supply assembly supported by the frame, the power supply assembly including a locking mechanism that is configured to securely fasten the power supply assembly to the frame;
   a pair of drive wheels mounted to the frame;
   a pair of drives mounted on the frame, each drive operatively coupled to a respective drive wheel; and
   a shroud mounted over the frame, the shroud comprising a major portion and a minor portion, the major portion being positionable over the power supply assembly and including a slot that is adapted to receive the seat post when the shroud is mounted over the frame such that the major portion is removable without first removing the seat,
   wherein the power supply assembly is configured to interfere with the major portion so as to prevent the major portion from being mounted to the frame unless the locking mechanism has securely fastened the power supply assembly to the frame.

10. The wheelchair of claim 9 wherein the drive wheels are mounted to a front portion of the frame.

11. The wheelchair of claim 10, wherein (i) the frame further comprises a transverse beam and two independent arms that are coupled to and extend from the transverse beam so as to define respective cantilevers, and (ii) each arm includes a rear wheel mounted proximate to an end portion thereof.

12. The wheelchair of claim 11, wherein the power supply assembly is entirely supported by the two rearward extending arms.

13. The wheelchair of claim 11, wherein each independent arm is capable of flexing independent of the other.

14. A front wheel drive powered wheelchair comprising:
- a frame, the frame comprising a front portion, a seat post, and two independent arms extending rearward from the front portion;
- a seat coupled to the seat post;
- a pair of opposing drive wheels coupled to the front portion of the frame;
- a pair of drives mounted on the frame, each drive operatively coupled to a respective drive wheel;
- a pair of rear wheels, each rear wheel coupled to a respective independent arm; and
- a power supply assembly including a battery compartment and at least one battery supported by the battery compartment,
- wherein the independent arms are configured to slidably receive the battery compartment such that the battery compartment is supported by and rests on the independent arms without first removing the seat.

15. The wheelchair of claim 14, wherein each independent arm is capable of flexing independent of the other arm.

16. The wheelchair of claim 14, wherein the battery compartment includes a latch that securely locks the power supply assembly to the frame.

17. The wheelchair of claim 14, wherein the battery compartment is entirely supported by the independent arms.

18. The wheelchair of claim 14, wherein each independent arm includes a back end that flares outwardly away from the other independent arm.

19. The wheelchair of claim 14, wherein the frame has a max length measured along a first direction from a front end of the frame to a back end of the frame, and the independent arms have a length measured along the first direction that is a major portion of the max length.

20. The wheelchair of claim 19, wherein the front portion includes a transverse beam, and wherein the seat post extends up from the transverse beam and the two independent arms extend rearward from the transverse beam.

21. The wheelchair of claim 20, wherein the drivers are mounted transversely to the first direction forward of the transverse beam.

22. The wheelchair of claim 1, wherein each independent arm includes a back end that flares outwardly away from the other independent arm.

23. The wheelchair of claim 1, wherein the frame has a max length measured along a first direction from a front end of the frame to a back end of the frame, and the independent arms have a length measured along the first direction that is a major portion of the max length.

24. The wheelchair of claim 23, wherein the front portion includes a transverse beam, and wherein the seat post extends up from the transverse beam and the two independent arms extend rearward from the transverse beam.

25. The wheelchair of claim 24, wherein the drivers are mounted transversely to the first direction forward of the transverse beam.

* * * * *